United States Patent
Dalla Valle

(10) Patent No.: US 12,018,651 B2
(45) Date of Patent: Jun. 25, 2024

(54) OSCILLATING DEVICE FOR GENERATING ELECTRICITY AND METHOD FOR ADJUSTING OSCILLATING DEVICES

(71) Applicant: Ivan Dalla Valle, Breganze (IT)

(72) Inventor: Ivan Dalla Valle, Breganze (IT)

(*) Notice: Subject to any disclaimer, the term of this patent is extended or adjusted under 35 U.S.C. 154(b) by 8 days.

(21) Appl. No.: 18/000,506

(22) PCT Filed: Jun. 10, 2021

(86) PCT No.: PCT/IT2021/050181
§ 371 (c)(1),
(2) Date: Dec. 1, 2022

(87) PCT Pub. No.: WO2021/250717
PCT Pub. Date: Dec. 16, 2021

(65) Prior Publication Data
US 2023/0213017 A1    Jul. 6, 2023

(30) Foreign Application Priority Data
Jun. 10, 2020 (IT) ................. 102020000013912

(51) Int. Cl.
*F03D 5/06* (2006.01)
*H02K 7/18* (2006.01)

(52) U.S. Cl.
CPC ............ *F03D 5/06* (2013.01); *H02K 7/18* (2013.01); *F05B 2260/421* (2013.01)

(58) Field of Classification Search
CPC ........ F03D 5/06; H02K 7/18; F05B 2260/421
See application file for complete search history.

(56) References Cited

U.S. PATENT DOCUMENTS

2009/0224549 A1    9/2009  Williams
2009/0224553 A1*   9/2009  Williams ............ F03D 5/06
                                              290/55

FOREIGN PATENT DOCUMENTS

AT        508 273 A1      12/2010
BE      1 018 730 A3       7/2011
(Continued)

OTHER PUBLICATIONS

International Search Report and Written Opinion received in PCT Application No. PCT/IT2021/050181 dated Oct. 9, 2021 in 15 pages.
(Continued)

*Primary Examiner* — Viet P Nguyen
(74) *Attorney, Agent, or Firm* — Knobbe Martens Olson & Bear LLP

(57) ABSTRACT

Described is an oscillating device for generating electricity from a fluid flow, comprising at least one oscillating part, at least one support, fixed to a reference surface and connected to the oscillating part at an oscillation axis, at least one counter-balancing system connected to, and/or acting on the oscillating part, at least one adjustable profile configured to be at least partially immersed in the fluid flow and movably connected to the oscillating part. The oscillating device comprises an adjustment system configured to change the position of the adjustable profile with respect to the fluid flow between at least one position of greatest resistance and at least one position of least resistance. The invention also relates to an adjustment method for oscillating devices designed to generate electricity, according to which adjustments to the position of the adjustable profile are made as a function of certain parameters, such as the speed and/or the change in direction of the oscillation of the oscillating part, detected by a series of sensors.

15 Claims, 13 Drawing Sheets

(56) References Cited

FOREIGN PATENT DOCUMENTS

| ES | 2 527 360 A1 | 1/2015 |
|---|---|---|
| KR | 2013 0094269 A | 8/2013 |
| WO | WO2009/110997 A2 | 9/2009 |

OTHER PUBLICATIONS

Italian Search Report in IT 202000013912 dated Oct. 2, 201 in 23 pages.

* cited by examiner

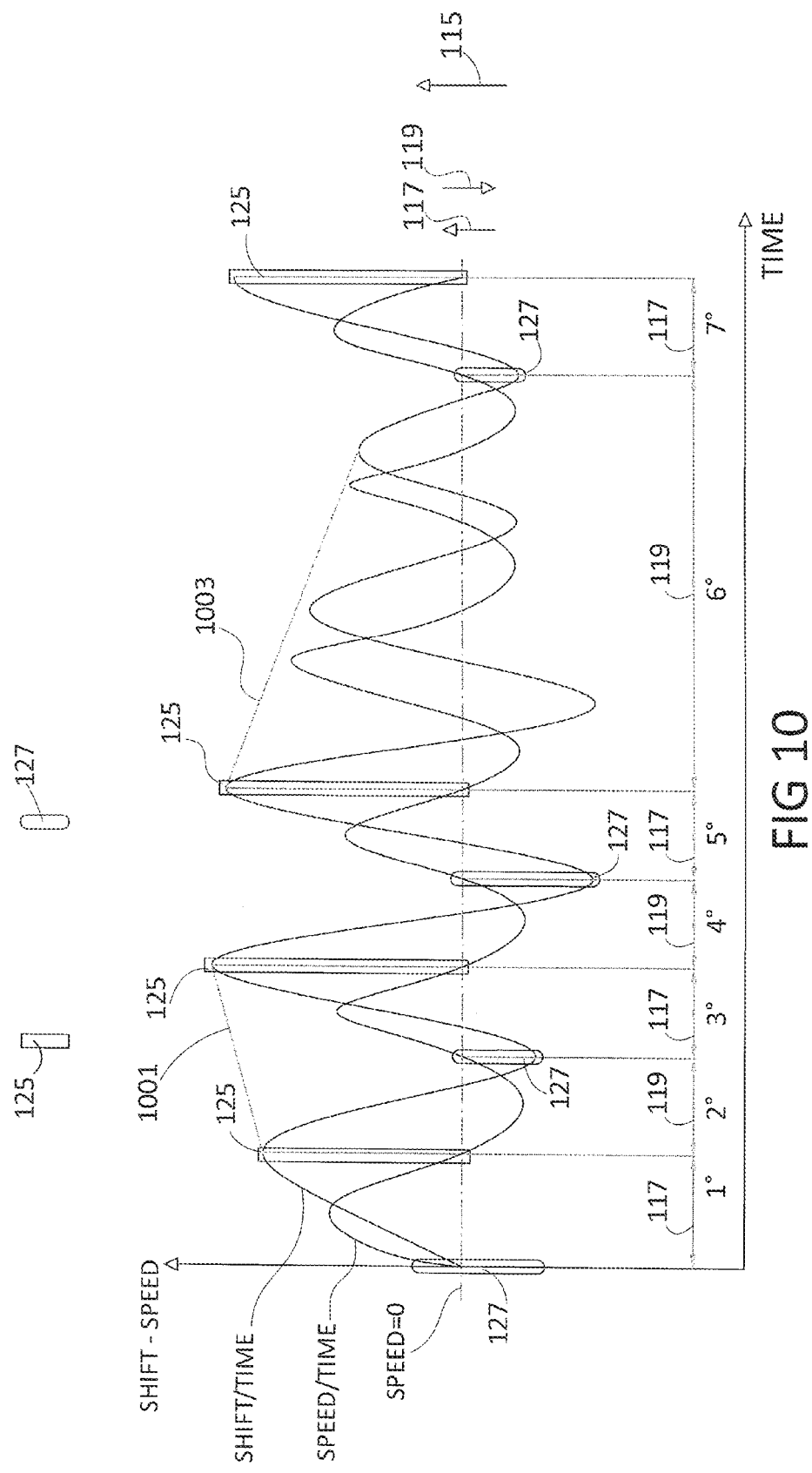

OSCILLATING DEVICE FOR GENERATING ELECTRICITY AND METHOD FOR ADJUSTING OSCILLATING DEVICES

CROSS-REFERENCE TO RELATED APPLICATIONS

This application is the U.S. National Phase under 35 U.S.C. § 371 of International Application PCT/IT2021/050181, filed Jun. 10, 2021, which claims priority to IT Application No. 102020000013912, filed Jun. 10, 2020, the entire contents of each of which are incorporated by reference herein and made a part of this specification.

SUMMARY

This invention relates to an oscillating device for generating electricity and a method of adjusting oscillating devices.

The prior art systems use profiles attached to the oscillating part, which are moved to vary their position with respect to the fluid to power the movement of the oscillating part.

The prior art oscillating devices, as they subject to highly variable weather conditions, present some drawbacks in the presence of strong gusts of wind or irregular wind; the drawbacks are related to damaging stresses and risks of breakages to self-supporting or sail profiles with frames with potential breakage and detachment of the frame, which, in addition to damaging the device, may represent a danger to the surrounding environment (oscillating devices of this type are described, for example, in patent documents US2009/224553A1 and BE1018730A3). Moreover, in situations of excessive wind, in the prior art devices a critical intensity of the fluid flow must necessarily be measured (for example, by means of sensors, such as anemometers) and then the oscillating part or individual profiles must be lowered by means of operations (such as folding side fins or shortening the telescopic shaft), which due to the size of the devices cannot be immediate and in any case is substantially longer than tens of seconds, thus exposing the devices to the problems described above.

It should be further considered that incidental failures in the power supply of actuators for the adjustment of the profiles or other mechanical failures would cause the profiles to remain in a position of increased resistance with consequent damage from such exposure. Moreover, in the case of devices whose profiles are configured like Savonius turbines rotating freely (as in patent document BE1018730A3), these profiles would rotate at high speed in the event of gusts, exposing the device to breakages.

Another problem of the prior art technique is related to the profile adjustment systems, which implement both the steps with a stress command (as in patent document US2009/224553A1), with the difficulty of being able to align the profiles to the fluid flow and minimise the damping; even in the systems where the profiles rotate freely to the fluid (due to the difference in resistance between the concave and convex part of the two profiles) even in the return step (as in patent document BE1018730A3) there is a damping, since the profile, rotating during the return step, does not maintain a constant angle of attack with respect to the fluid during the return oscillation and, moreover, in the presence of certain intensities of fluid flow, there may be a loss of synchrony between the rotation of the profiles and the oscillation of the device.

Other disadvantages of the prior art relate to the type of profiles used, which are rigid or framed and which rotate with respect to a shaft and/or pin connected to the oscillating part. Such a coupling causes some problems, also taking into account the aerodynamic and adjustment advantage of making several profiles with a reduced chord for the same overall surface. There can in fact be constructional difficulties in sizing adequate surfaces of the profiles to withstand the stresses of very high winds, increased production and maintenance costs and increased overall structural weight.

A further problem with prior art solutions concerns the method of adjusting the oscillating devices, and in particular when and how the control of the profile adjustment is actuated.

In fact, the adjustment in the prior art devices is obtained by means of weights or actuators that intervene on predetermined values of the oscillation angle (see for example patent documents US2009/0224549 and WO2009/110997) or that modify the inclination of the profiles when the inclination of the oscillating part changes (as in patent document AT508273A1 for the thrust step) or that can also be influenced by the intensity of the flow (as in patent document AT508273A1 for the recall step). One problem with patent document AT508273A1, for example, is that a certain fluid intensity may not be sufficient to keep the profile open for the recall step, whereas above a certain fluid intensity the profiles may remain open.

In the prior art there are no adjustments on the adjustable profiles, which intervene substantially instantaneously when the oscillation is about to be completed in both the thrust and recall steps and also independently of the fluid flow and irrespective of a predetermined value of the oscillation angle.

Another drawback is the resistance that the oscillating part presents when changing direction where the acceleration is maximum.

A further problem is the frequency of the adjustments, which in prior art devices is bound to the frequency of oscillation.

Lastly, in prior art oscillating devices, there is the structural and overall size problem of using large flywheels in order to accumulate kinetic energy to be constantly transferred to a current generator.

In summary, the main problems that the invention aims to overcome are related to:
general efficiency of the device,
adaptation and safety of the device to the various and changing working conditions which are possible,
frequency and method of implementation of the adjustments to be made to the adjustable profiles,
overall structural weight of the device,
rated power of the device as a function of the profile surfaces and the length of the oscillating part,
anchoring the device support in its positioning location,
transmission of the oscillation to storage flywheels and/or current generators,
reliability, construction and maintenance cost-effectiveness.

The main aim of the invention is to overcome the above-mentioned drawbacks of the prior art.

In particular, the aim of the invention is to improve the energy efficiency of the prior art oscillating devices.

Another aim is to be able to increase the nominal power by increasing the surface area of the profiles and/or increasing the length of the oscillating so part with respect to the prior art (increase in useful leverage with the same weight, construction costs and safety).

Another aim is to improve the reliability and safety of prior art oscillating devices under the various flow conditions.

These and other aims are achieved by an oscillating device for generating electricity, which advantageously uses an innovative connection system between the adjustable profiles and the oscillating part according to the appended claim 1, and by an innovative method of adjusting oscillating devices according to the appended claim 14.

Further technical features are indicated in the dependent claims.

According to the invention, advantageously the adjustable profiles are connected to the oscillating part in such a way as to allow the system to implement an active adjustment (that is, by means of a thrust, traction or torque action) on the adjustable profiles to bring them to a position of greatest resistance with respect to the fluid (a position which can be maintained for the entire useful thrust step) and to passively release them so that they adopt a position of least resistance with respect to the fluid (a position which can be maintained for the entire recall step).

The invention also describes an adjustment method which can be advantageously applied independently of the fluid flow, the weight of the profiles and/or a predetermined angle.

BRIEF DESCRIPTION OF THE DRAWINGS

Further features and advantages of the invention will become more apparent in the light of the following detailed description, provided for illustrative but not limiting purposes, of some preferred embodiments of the oscillating device according to the invention, and with the aid of the appended drawings, wherein:

FIG. 10 shows examples of speed-time and displacement-time curves relating to the oscillating part of the oscillating device and some consequent adjustments that can be made in a particular configuration and/or adjustment method;

DETAILED DESCRIPTION

The accompanying drawings show an oscillating device comprising a support 105 designed to support an oscillating part 101 that oscillates with respect to an axis of oscillation 103, for example by means of a system of bearings or equivalent means.

Figure 1:
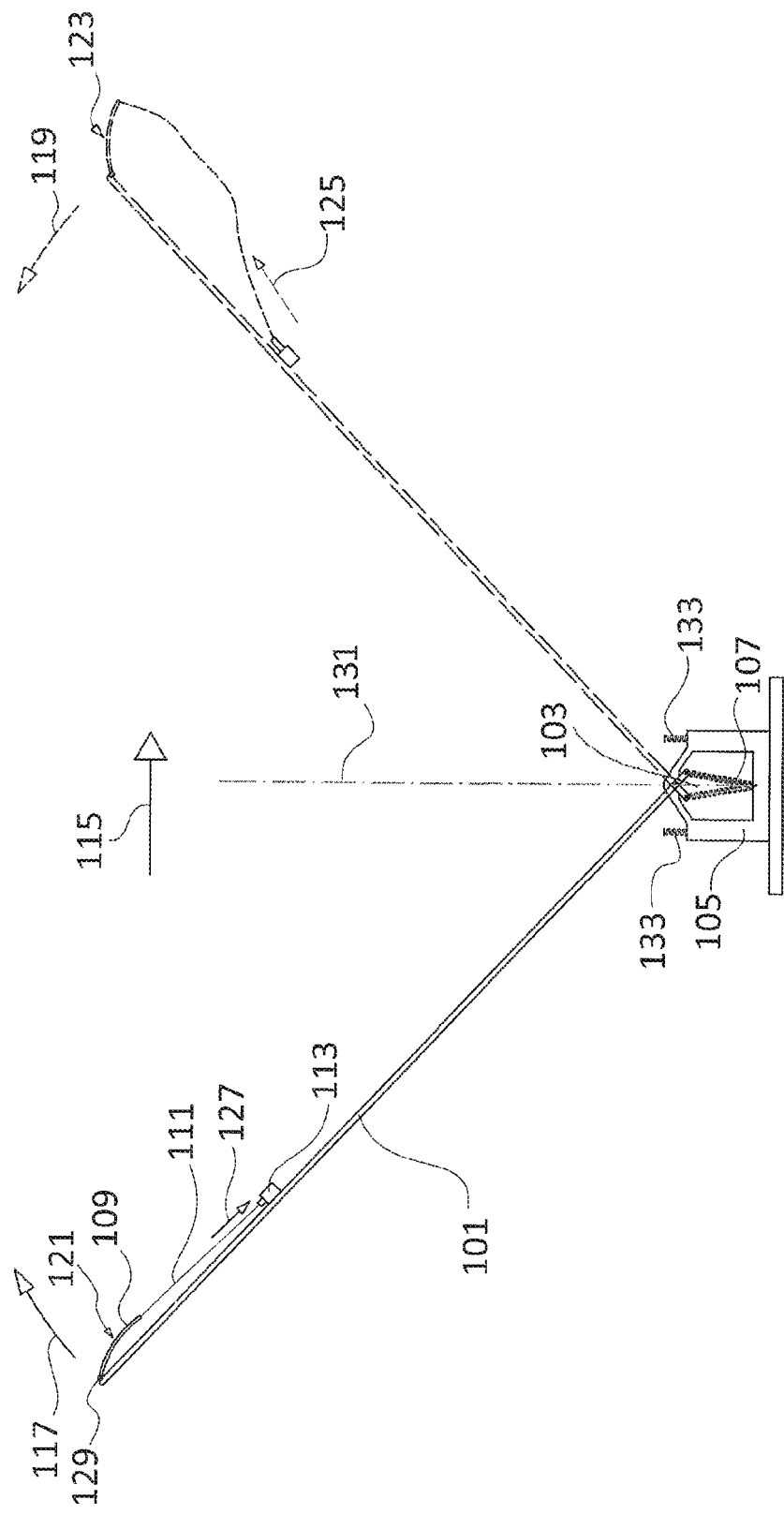
FIG. 1 shows a schematic side view of the oscillating device according to the invention in two different positions.

The oscillating device is also equipped with:
- a counter-balancing system 107 acting on and/or is connected to at least the oscillating part 101, the amplitude of which is delimited by end-of-stroke springs 133;
- at least one adjustable profile 109 connected to the oscillating part 101 by one or more joining or connecting points 129;
- an adjustment system 111 connected to the adjustable profiles 109 and to the oscillating part 101 or to the support 105 or other fixed part (FIG. 1).

The adjustment system 111 may comprise an actuating device 113, cables and/or rods connected in turn to the adjustable profiles 109.

Figure 2:
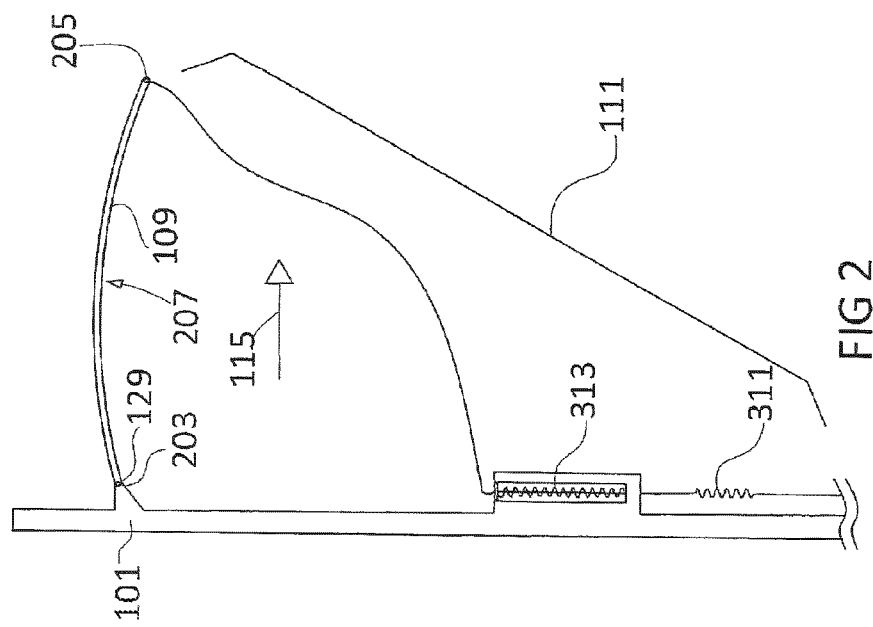
FIG. 2 is a schematic side view of a first variant of an adjustable profile connected to the oscillating part, according to the invention.

According to a specific embodiment, the adjustable profile 109 is connected to the oscillating part 101 by at least one connection point 129 between a leading edge 203 of the adjustable profile 109 itself and a pressure centre 207 thereof (FIG. 2).

Figure 9:
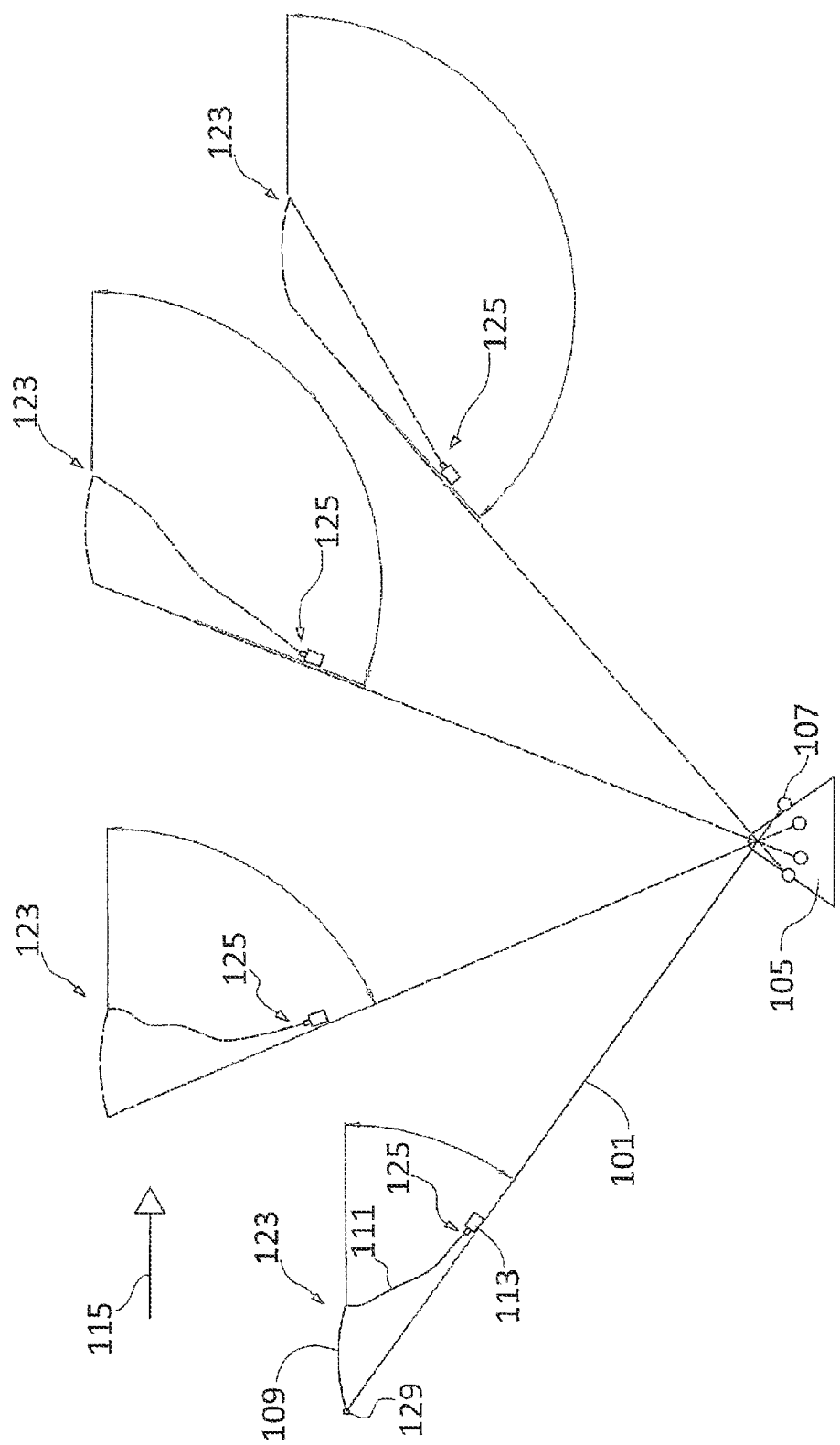
FIG. 9 is a schematic side view of the oscillating device shown in various possible positions and wherein the adjustable profile is in the position of least resistance with respect to the flow, according to the invention.

Advantageously, by means of such a connection, when the adjustment system 111 implements a passive release adjustment (schematically represented by the arrow 125) or interrupts the active adjustment 127, the adjustable profile 109 moves from a position of greatest resistance 121 with respect to the fluid flow 115 to a position of least resistance 123 by the effect of a mechanical moment, which is generated by the force of the same fluid flow 115 applied in the pressure centre 207 of the same adjustable profile 109, with respect to the connection point 129, thus resulting in a constant alignment of the adjustable profile 109 in a position of least resistance 123, when the oscillation angle varies (FIG. 9) and/or also in case of changes in the direction of the fluid flow 115, thus reducing the damping 1003 (FIG. 10).

According to specific embodiment, the connection points 129 may be located near or on the leading edge 203 of the adjustable profiles 109 (as shown in FIG. 2).

Figure 3:
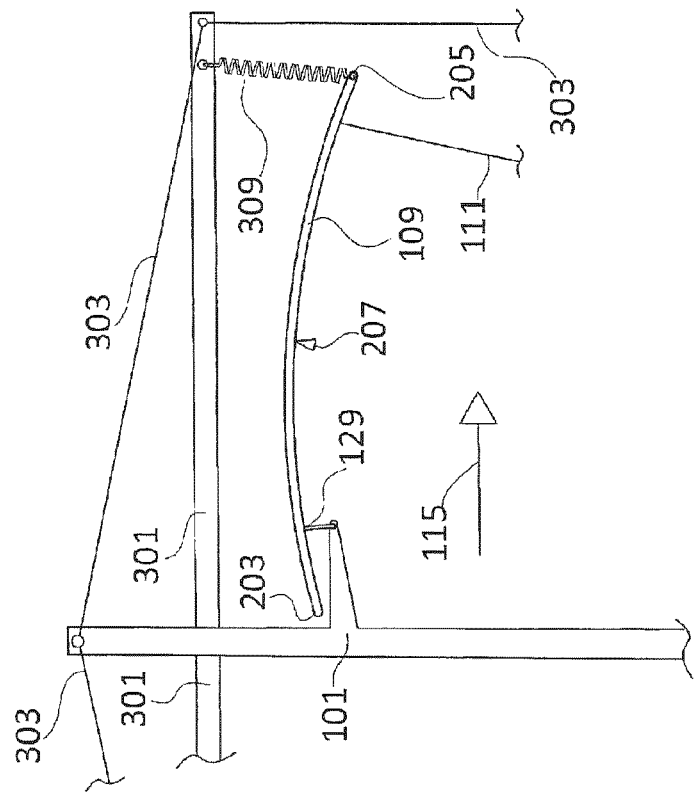
FIG. 3 is a schematic side view of a second variant of an adjustable profile connected to the oscillating part, according to the invention.

FIG. 3 shows a particular variant of the invention, which employs a further recall system 301, 303, 309 located between the oscillating part 101 and the adjustable profile 109, with the function of maintaining the adjustable profile 109 in the position of least resistance 123 (when the active adjustment 127 is not present); this operation can also take place by means of a system for winding the adjustable profiles 109 with respect to their leading edge 203. Advantageously, this recall system 301, 303, 309, in the event of a failure of the adjustment system 111, ensures the position of least resistance of the adjustable profile (based on a normally open position). A variant of the preceding embodiment employs a spring 313 (FIG. 2) to keep the adjustment system 111 released, for example when the adjustable profile 109 is made with a sail.

In a particular embodiment (FIG. 3), the further recall system 309 is used in order to balance and/or compensate for the weight of the adjustable profile 109 with respect to the fluid flow 115; this balancing action acts in a complementary and/or combined manner with the pressure of the fluid flow 115, which continuously moves and orients the adjustable profile 109 in the position of least resistance 123 due to the already described mechanical moment of the resulting pressure force.

According to an alternative embodiment, the adjustment system 111 is connected to the trailing edge 205 of the adjustable profiles 109, advantageously creating more leverage between the trailing edge 205 itself and the connection point 129.

According to another preferred embodiment shown in FIGS. 7, 8A, 8B, 8C, 8D and 8E, the oscillating part 101 comprises side elements 701, 703, 705 arranged laterally to the oscillation plane and having the function of connecting the adjustable profiles 109 to each other, with the oscillating part 101 and with the adjustment system 111, thus making it possible to use sail-type adjustable profiles without a frame, which do not require a pivot on which to rotate and which make it possible to optimally distribute the pressure of the fluid flow 115 through several connection points 129 for each individual adjustable profile 109.

By means of the side elements 701, the adjustable profiles can be substantially simply hung on said oscillating part.

The orientation and configuration of the side elements 701 can be achieved through various combinations of rigid and/or hollow parts, depending on the various shapes and structures of the adjustable profiles 109 used.

Figure 16:
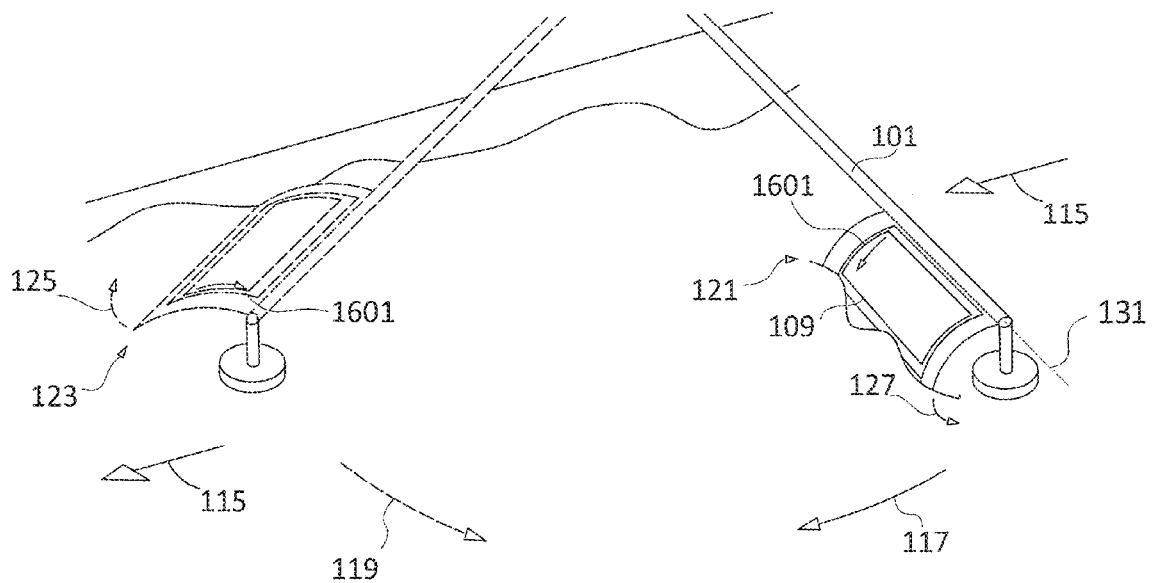
FIG. 16 is a perspective view of a variant of the embodiment of the oscillating device of FIG. 15, according to the invention.

Further configurations provide for the use of adjustable profiles 109 arranged obliquely and/or in a circular fashion, consisting of kites, of various geometrical shapes, with a structure of a rigid, semi-rigid or mixed type, with inserts inflatable by air or other gases that are lighter than the fluid flow 115, also with forced sliding channels 1601 within the surface of the adjustable profiles 109 and also depending on the position to be adopted (as shown in FIG. 16). According to a preferred embodiment, the connection points 129 are made in the leading edge 203 and the adjustment system 111 is connected to the trailing edge 205, it being advantageous to use frameless adjustable profiles 109 of the sail type without frame, due to their better weight/area and weight/strength ratio (when compared to self-supporting or framed profiles).

By means of this method of connecting the profiles with the oscillating part 101, the use of bearings or bushings for the rotation of pins can be advantageously avoided with respect to the prior art, thanks to lower maintenance and production costs; this advantage increases when, with the same overall surface area, series of profiles with reduced chords are used (with aerodynamic and adjustment advantages).

Moreover, this configuration, with the light profiles (not self-supporting and without a rigid shaft to rotate) which move with respect to an oscillating part, advantageously allows the overall surface area of the profiles to be increased and/or to increase the length of the oscillating part, thus being able to increase the nominal power of the devices and limiting the relative manufacturing and maintenance costs and overall weight, whilst also increasing the reliability and safety of the device.

According to one variant embodiment, the adjustable profiles 109 and part of the side elements 701 can be raised and lowered from the rest of the oscillating part 101.

Figure 8A:
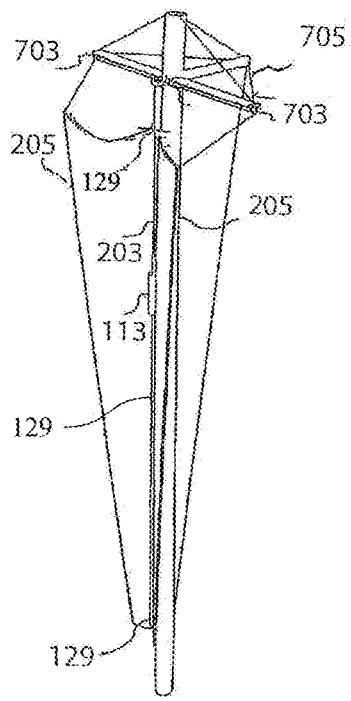
FIGS. 8A, 8B, 8C, 8E represent perspective views of respective variants of the oscillating device, according to the invention, wherein the profiles are of sail type and supported by an oscillating frame.
Figure 8B:
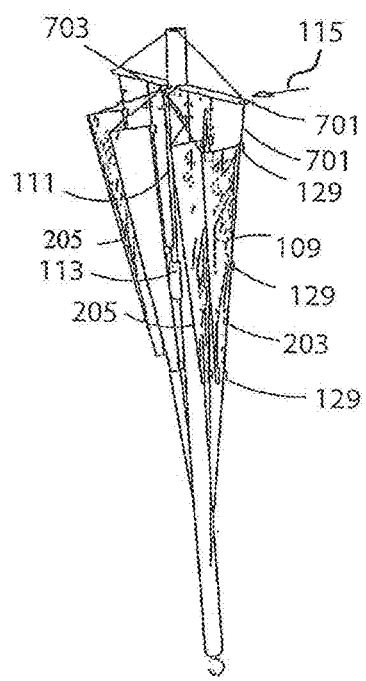
Figure 8C:
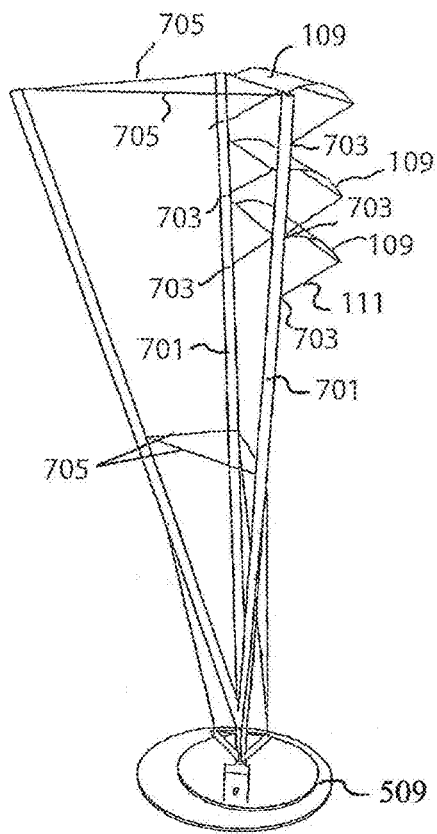
Figure 8D:
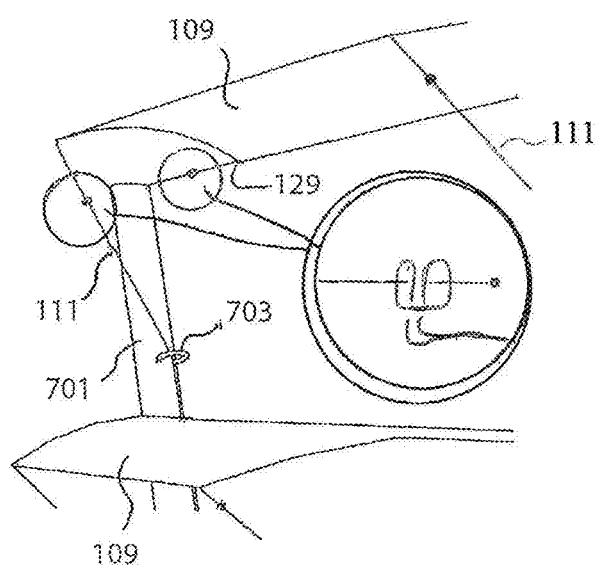
FIG. 8D shows a detailed example relative to the fixing of the adjustable profiles.
Figure 8E:
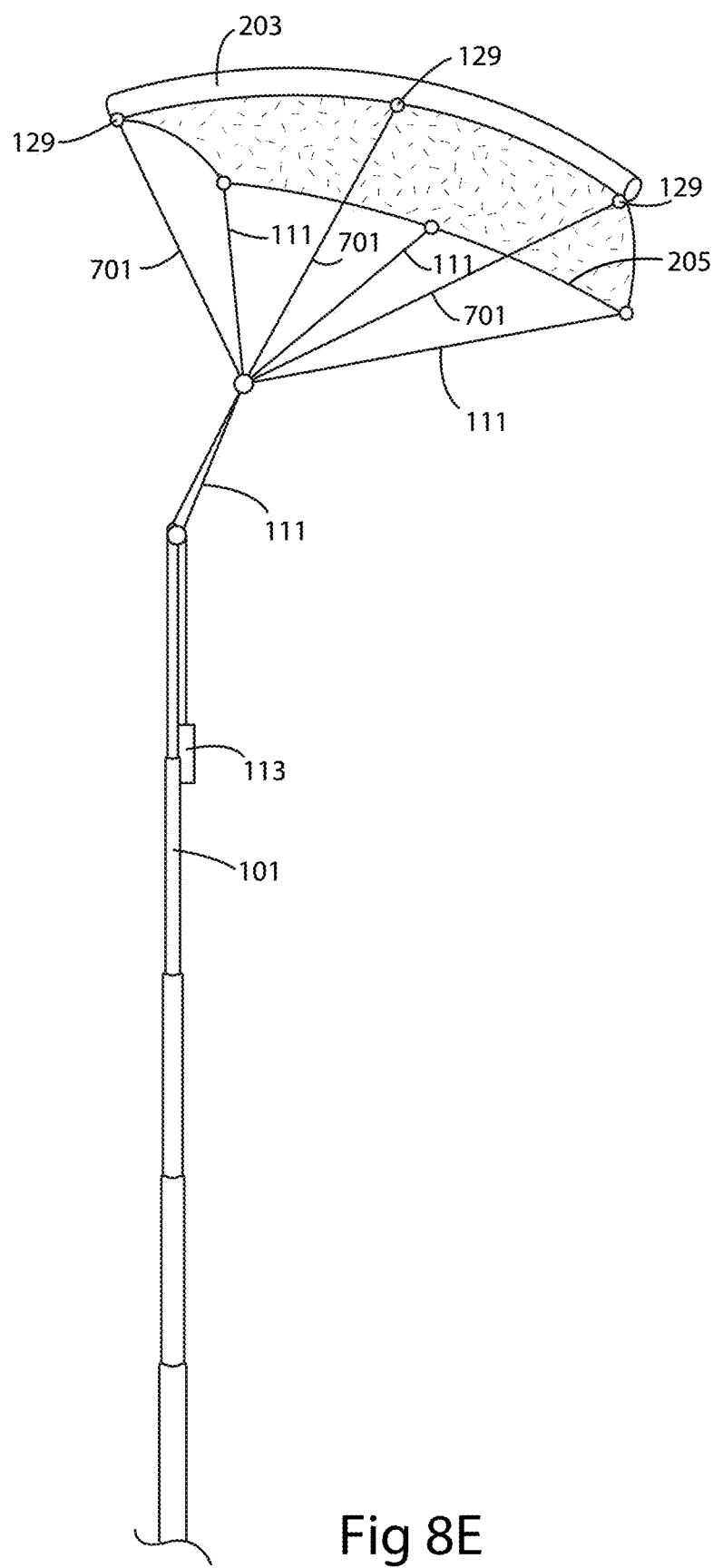

According to a further variant embodiment, an oscillating shaft 101 is used, the end of which is connected by cables or side elements 701 to a kite 109 which may have the leading edge 203 supported by an air tube (FIG. 8E).

The oscillation of the oscillating part 101 may vary by a few degrees up to the full maximum angle permitted by the structure and may develop with amplitudes with respect to an equilibrium position 131 or even in another portion of the oscillation plane. The oscillation plane can also have multiple orientations depending on the type of use.

Figure 4:
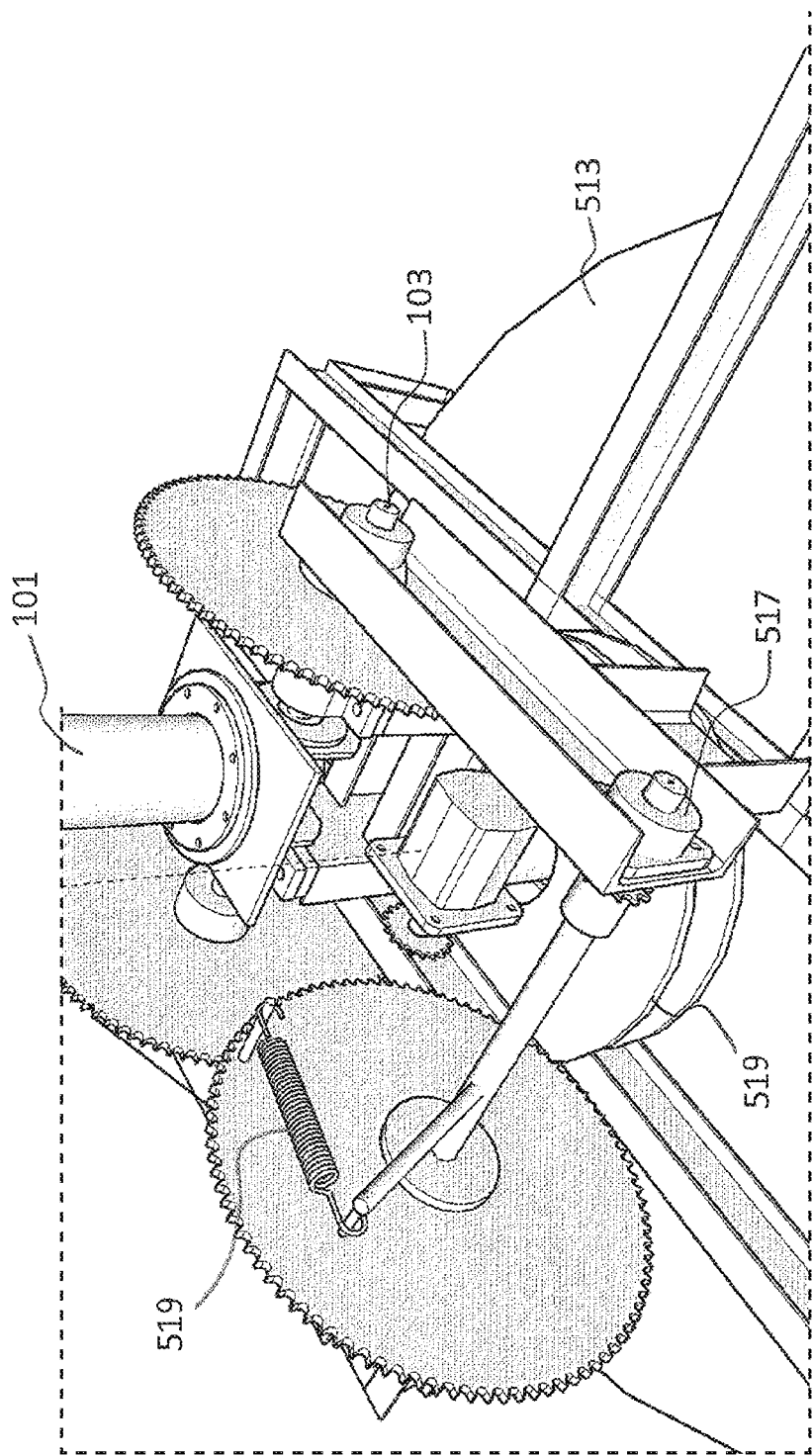
FIG. 4 is a schematic perspective view of the motion transmission of a further variant-of the oscillating device, according to the invention.

According to a preferred embodiment (FIGS. 4, 5), the oscillation axis 103 is misaligned (positioned downwind) with respect to the axis of rotation of a rotatable fifth wheel 509 in order to facilitate the alignment of the oscillation plane with the fluid flow 115.

According to a particular embodiment (shown in the FIG. 2), in the adjustment system 111 it is possible to adjust the maximum force which can be exerted on each or all of the adjustable profiles 109, for example by means of a safety spring 311 or by means of an automatic release or programmed breakage between the adjustment system 111 and the adjustable profile 109; in the presence, for example, of gusts of wind, the maximum pressure exerted on the adjustable profiles 109 can be predetermined at a safety value, and such a configuration can also be useful in the event of accidental failure of the adjustment system 111, allowing the adjustable profiles 109 to independently arrange themselves in a position of least resistance 123.

Figure 12:
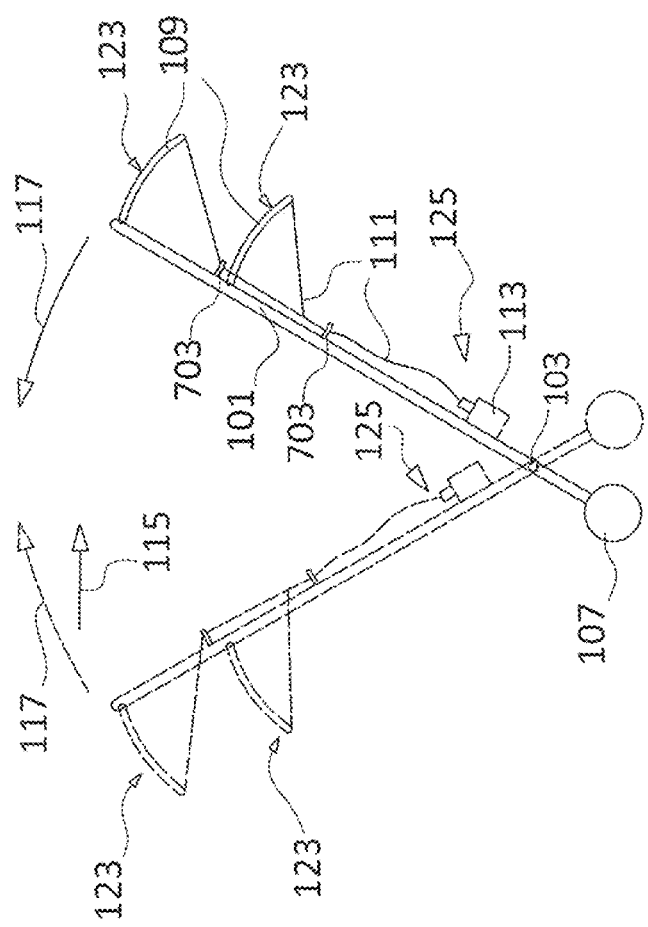
FIG. 12 is a schematic side view of the operation of an oscillating device, according to the invention, wherein the adjustable profiles can adopt a position of least resistance in both directions of oscillation.

Further, the adjustable profiles 109 and the relative adjustment system 111 may also be configured to adopt the position of least resistance 123 to the fluid flow 115 in both the directions of oscillation of the oscillating part 101, as shown in the variant embodiment of FIG. 12.

The oscillating part 101 is coupled to at least one current generator 507 and this coupling may comprise elements variously configured with each other, such as (FIGS. 4, 5, 7):
  at least one flywheel 513 with an axis of rotation parallel or at right angles or inclined to the axis of oscillation 103;
  elastic accumulation systems 519 that are also adjustable which can be configured together with unidirectional devices 517 and/or anti-pull joints.

Advantageously, the accelerations typical of the oscillatory movement (maximum at the change of direction) can be transmitted to a storage flywheel 513 and/or a generator 507 uniformly without dissipation.

Figure 5:
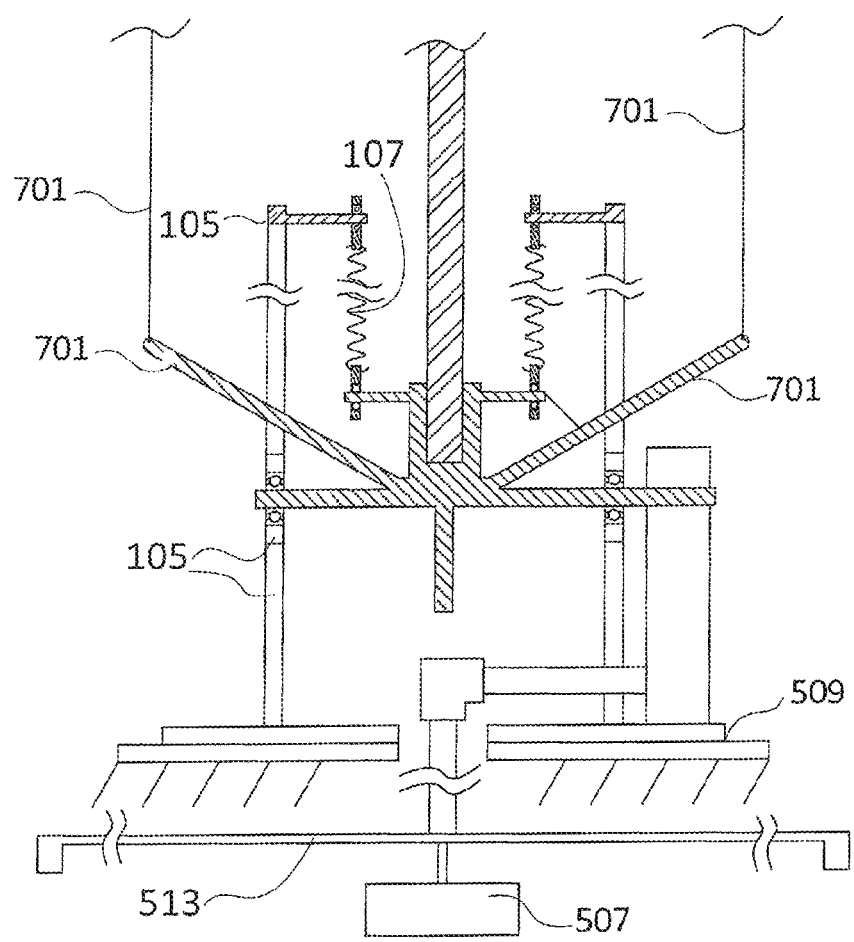
FIG. 5 is a partial sectional front view of the oscillating device, according to the invention.

The configuration which comprises the use of a flywheel 513 with a substantially vertical axis of rotation (FIGS. 5, 13, 15) facilitates the use of large flywheels 513, even with configurations where this axis of rotation is orthogonal or inclined with respect to the axis of oscillation 103 (in the example of FIG. 5 advantageously the barycentre of the device lowers, making it more stable during operation). For example, if the device is positioned above a building, the flywheel 513 can be placed in a basement compartment by connection with a rigid vertical shaft or with an elastic torsion with a axis of rotation coinciding with any axis of rotation of the rotatable fifth wheel 509.

According to particular embodiments (FIG. 4), the oscillating device comprises an elastic system 519 placed between the motion transmission system of the oscillation axis 103 and the storage flywheel 513 and/or the current generator 507 with the function of storing and returning the peak forces relative to the maximum accelerations during the oscillation and/or relative to sudden increases in the fluid intensity; the elastic system 519 can also be installed in combination with unidirectional and/or non-return devices 517 of the transmission motion.

Figure 6:
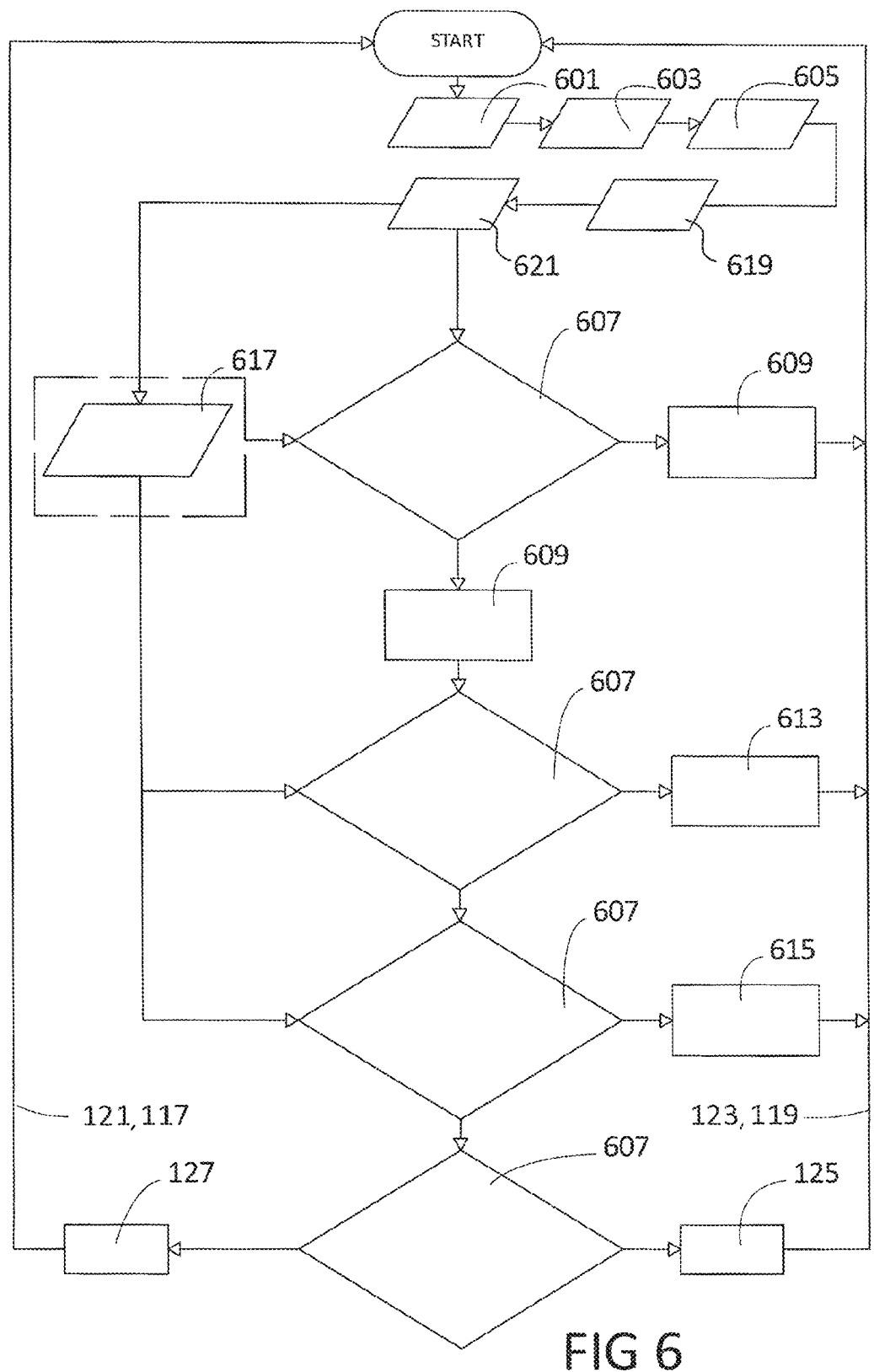
FIG. 6 is a block diagram relating to the method of adjusting the oscillating device, according to the invention.
Figure 7:
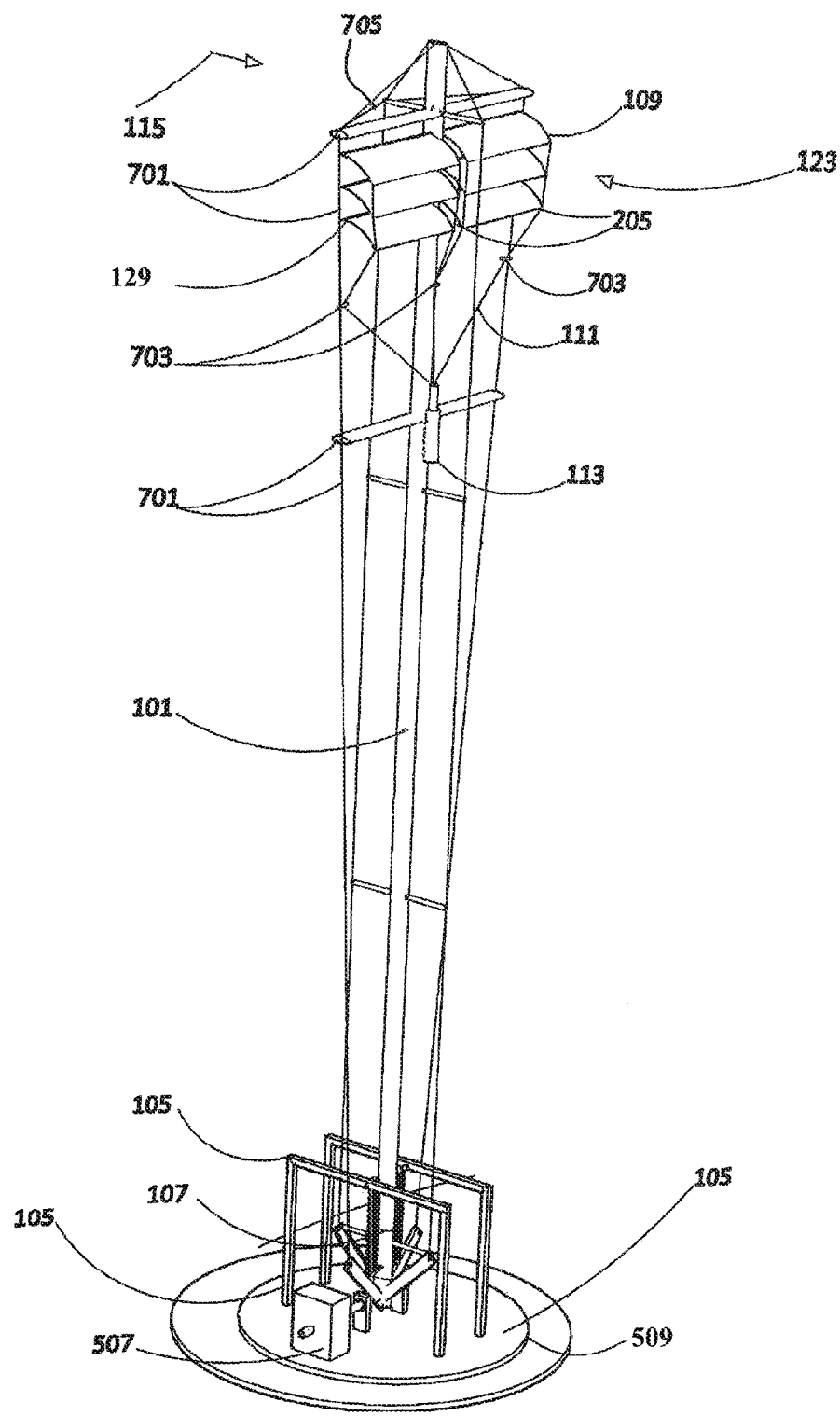
FIG. 7 represents a perspective view of a variant of the oscillating device, according to the invention, having profiles arranged in a first horizontal configuration.

According to a particular method of adjustment, devices are used for detecting the oscillation speed and/or direction of the oscillating part 101, referred to for simplicity as speed sensors 603, in order to perform the adjustment (FIG. 6).

According to a particular method of adjustment, a programmable unit 607 is used to receive data from the speed sensors 603, from pressure sensors 605 on the adjustable profiles 109 (for example, electronic transducers placed on the adjustment cable or torque control systems of the actuating device 113), from flow sensors 601 and finally from production sensors 619, 621 which detect the electricity produced and/or the number of revolutions of the flywheels 513.

Advantageously, the programmable unit 607 implements the passive release adjustment 125 (or terminates the active adjustment 127) and the active adjustment 127 through the adjustment system 111, in order to trigger, maintain and/or increase the oscillation of the oscillating part 101 according to the forced harmonic motion or also the resonant motion 1001 (FIG. 10), in order to produce electricity with the highest possible efficiency (also by increasing the amplitude and/or the frequency of oscillation).

The programmable unit 607 may also actuate the passive release adjustment 125 and active adjustment 127 in a manner proportional to the intensity of the fluid flow 115 and/or the oscillation of the oscillating part 101 and other parameters, so as to obtain different positions of greater resistance 121 and different positions of lower resistance 123 of the adjustable profiles 109, based on the values detected by the sensors described above and/or other sensors.

In the presence of very strong winds, it is advantageous, for example, to position the adjustable profiles 109, during the thrust step 117, in a position of greater resistance 121 which offers less resistance, possibly minimal, with respect to a maximum position of greater resistance 121 to the flow of fluid 115. Moreover, the position of greatest resistance can be determined and varied in the thrust step 117 in the various angles of oscillation also in order to advantageously maintain the lift of the adjustable profile 109 and the above-mentioned lift can be detected for example by the pressure sensors 605.

It may then be advantageous, for aerodynamic reasons, to adopt the choice of positions of less resistance 123, intermediate with respect to a position of minimum possible resistance 123, also in the recall step 119, for example to avoid turbulence on the adjustable profile 109 and/or to maintain the lift of the adjustable profile 109 also in the recall step 119 (a component of the lift may contribute to feeding the oscillation also in the recall step 119) as the oscillation angle varies and also in this case the above-mentioned lift may be detected by the pressure sensors 605.

The multiple adjustments, both for the positions of least resistance 123 in the recall step 119, and for the positions of greatest resistance 121 in the thrust step 117, make it possible to use adjustable profiles 109 having the same surfaces and constructional characteristics in a wide range of intensities of fluid flow 115 (in the case of winds that can vary, for example, from a few km/h to over 150 km/h).

The programmable unit 607 can, based on all or part of the values detected by the different sensors, vary the configuration and strength of the counter-balancing system 107, as well as the position of an inertia ballast by means of specific mechanisms 615.

The programmable unit 607 may also control a mechanical actuator 613 connected to the rotatable fifth wheel 509 for orienting the oscillating device according to the data detected by the flow sensors 601, and may, by means of another actuator 609, safely place the oscillating device outside the range of the fluid flow 115. The programmable unit 607 can also receive and transmit data and/or commands from and to a remote unit (block 617), according to a process schematically represented by the flow diagram in FIG. 6.

The operation of the oscillating device according to the invention is described in more detail below.

According to a particular embodiment with the adjustment system 111 in normally open mode (passive release adjustment 125), the fluid passes through the adjustable profiles 109 of a sail type or other lightweight types (shown in FIG. 11) without causing significant displacements of the oscillating part 101, since the fluid flow 115 moves the trailing edge 205 which is free to move; this mode is particularly advantageous in case of strong and irregular wind as a safety position.

When the adjustment system 111 implements the active adjustment 127, the oscillating part 101 moves to implement a first step called the thrust step 117 (FIG. 1).

When the adjustment system 111 implements the passive release adjustment 125 (or terminates the stress of the active adjustment 127) on the adjustable profiles 109, they move to a position of less resistance 123 and the force of the counter-balancing system 107, previously loaded during the thrust step 117, moves the oscillating part 101 in the opposite direction, implementing a second step called the recall step 119.

When the adjustment system 111 implements the active adjustment 127, the adjustable profiles 109 move to a position of greatest resistance 121 and the device resumes the thrust step 117.

The oscillating cycle is repeated in the presence of the fluid flow 115.

The movement of the oscillating part 101, by means of suitable mechanical means of coupling to a current generator 507, determines the production of electricity.

Figure 11:
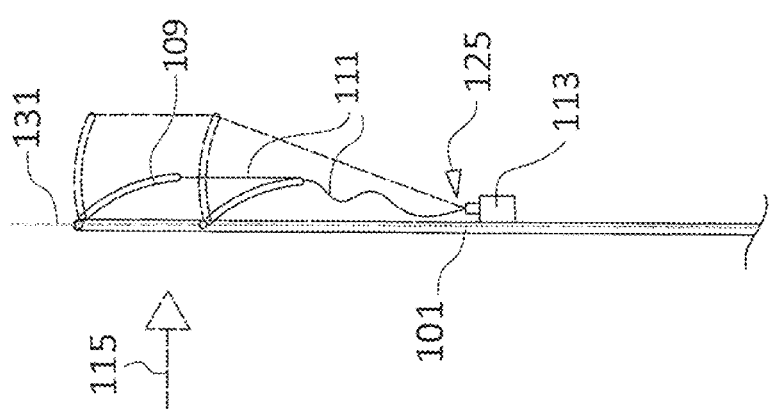
FIG. 11 is a schematic side view of the-oscillating device in initial equilibrium position with passive release adjustment and showing two positions of the adjustable profile, that is to say, in the absence of fluid flow and in the presence of fluid flow.

According to an innovative adjustment method, starting from an initial position shown in FIG. 11 (normally open), once the fluid flow 115 has been detected, the adjustment system 111 actuates the active adjustment 127 by blocking and/or moving the adjustable profiles 109 to a position of greater resistance 121 and causing the oscillating part 101 to move in one direction.

When the speed of the oscillating part 101 detected by the speed sensors 603 decreases to a predefined value, for example close to zero (indicating that the thrust step is about to be completed), the passive release adjustment 125 is actuated (or the active adjustment 127 ends), which brings the adjustable profile 101 to the position of least resistance 123. In this way, the thrust step is fully utilised; the oscillating part 101 thus moves in the opposite direction, advantageously performing the recall step 119.

When, by means of the speed sensors 603, the speed of the same oscillating part 101 approaches a predefined value, for example close to zero (indicating that the recall step in the current direction is about to be completed), the adjustment system 111 again actuates the active adjustment 127, which will again bring the adjustable profile 101 into a position of greater resistance 121, thereby triggering a new thrust step 117.

Advantageously, the adjustments are not solely dependent on the angle of oscillation of the oscillating part 101, but can be carried out according to the values of speed or its variation or change of direction, in each type of oscillation, in a manner independent of the value of the amplitude and in a manner substantially independent of the fluid flow, the weight of the profiles and a predetermined angle; such adjustments are also made, in an innovative manner, according to the speed (or its variation) of oscillation and/or the change in direction of the oscillating part 101 by intervening when the two steps of the oscillation (thrust 117 and recall 119) are about to be completed.

These adjustments can be implemented in order to produce a forced harmonic motion (of constant amplitude) or a resonant motion 1001 (of increasing amplitude) compatible with the maximum amplitude provided by the oscillating device.

Advantageously, therefore, compared to the prior art with the same intensity of fluid flow 115 it is possible to induce a resonance that widens the oscillation.

According to a particular variant of the adjustment method, the passive release adjustment 125, with the resulting position of least resistance 123 of the adjustable profile 109, is maintained for several successive recall steps 119, exploiting the inertia of the system, until, again based on values detected by means of the speed sensors 603 and the production sensors 619, 621, in the appropriate sequence (at the end of a recall step 119 with opposite direction to the fluid flow "against the wind" or during a recall step 119 with the same direction of the fluid flow 115 "in favour of the wind"), the active regulation 127 is again actuated to bring the adjustable profile 109 to a position of greatest resistance 121 in order to actuate a new thrust step 117 and to power the oscillation and the production of electricity and/or the rotation of flywheels 513 connected to at least one current generator 507. This has the advantage of maintaining an oscillation and/or the rotation of at least one flywheel 513 in a way that is useful for the continuous production of electricity with a lower frequency of adjustment compared to traditional oscillating systems, and therefore with less consumption, less wear and tear and greater efficiency (as shown in the diagram in FIG. 10).

Figure 13:
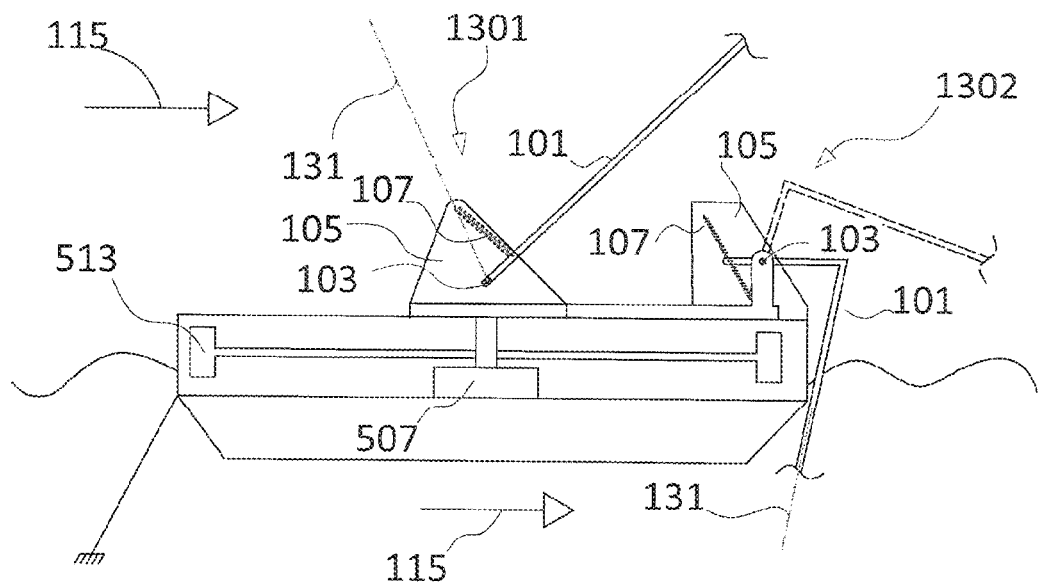
FIG. 13 is a schematic side view of the operation of a second and third embodiment of the oscillating device, according to the invention.
Figure 14:
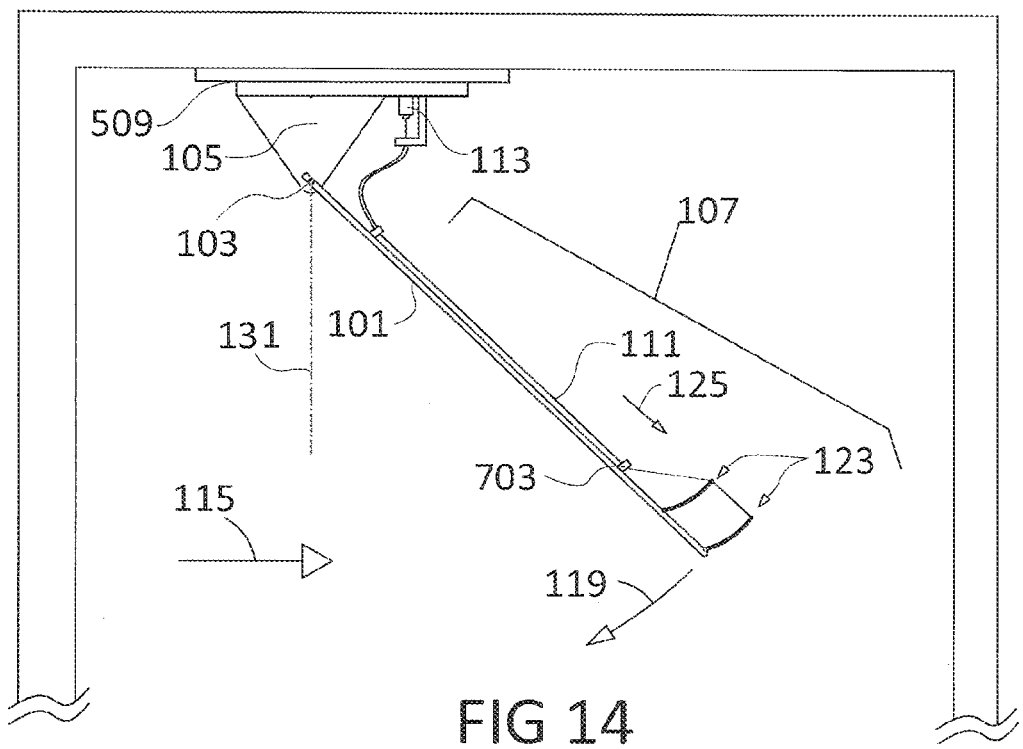
FIG. 14 is a schematic side view of a fourth embodiment of the oscillating device, according to the invention.

According to a further embodiment, shown in FIG. 13, the oscillating device is installed on suitable floating platforms or on vessels, such as cruise ships or merchant ships, and may comprise devices 1301 oscillating by the wind and/or oscillating devices 1302 exploiting the movement of the water which advantageously may keep the current generator 507 out of the water, maintaining in both embodiments a centre of gravity of the device close to the waterline with obvious constructional and general stability advantages.

According to a preferred embodiment, the invention comprises a series of supports 105 and oscillating parts 101 constrained to each other, where the oscillating movement may also be transmitted to a single flywheel 513 and/or to a single current generator 507. According to another variant, the different oscillating parts 101 and the adjustable profiles 109 have, on the other hand, autonomous adjustment and/or timing of the period of oscillation in order to more uniformly feed the motion of a single flywheel 513 and/or current generator 507.

Figure 15:
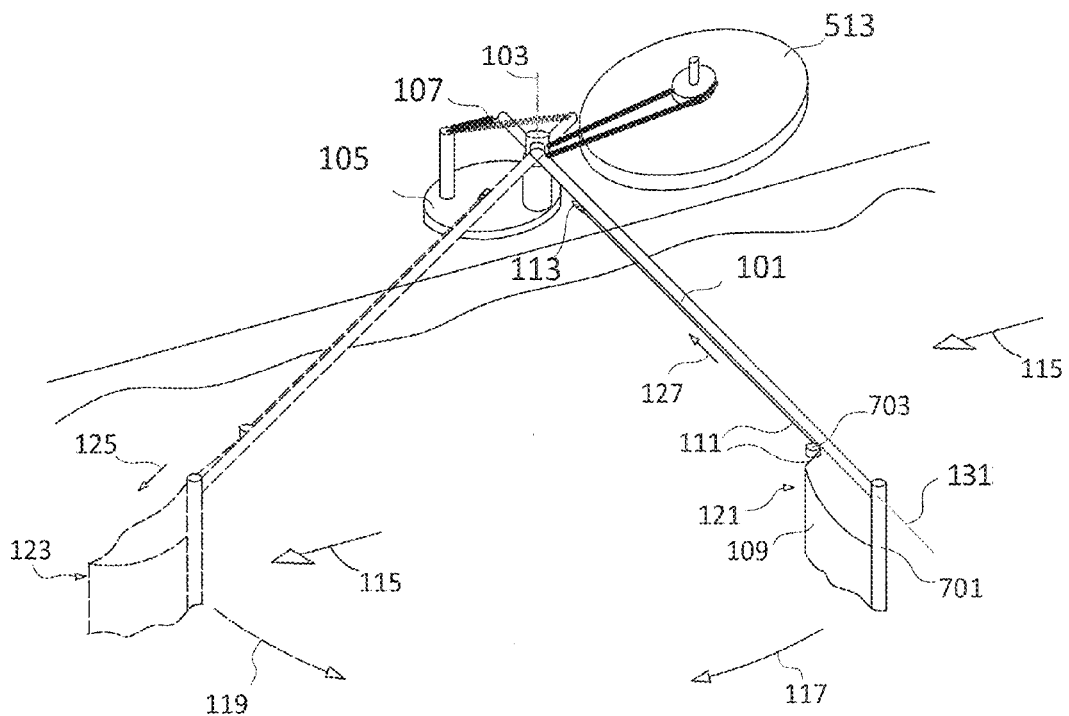
FIG. 15 is a perspective view of a fifth embodiment of the oscillating device according to the invention.

According to a further embodiment, shown in FIGS. 15 and 16, the device is used in the flow of liquid fluid 115, such as waterways or sea currents, and the adjustable profiles 109 are in contact with the fluid flow 115 also using a float connected to the oscillating part 101, whilst the support 105, with the counter-balancing system 107 and the current generator 507 and/or the flywheel 513, can be located out of the water.

According to the embodiments in which the flow of water is used, the adjustable profiles 109 and the relative adjustment system 111 and the oscillating part 101 must be suitably configured and dimensioned for this purpose, also with the flow of gas between different zones of the adjustable profiles 109 depending on the position to be adopted (121 or 123).

According to a further embodiment, the device can be integrated with photovoltaic systems and/or car charging stations.

It is clear from the description how the invention achieves the intended aims; it is also clear that experts in the trade may make various modifications to the described example embodiments, the scope of protection being defined by the appended claims. Industrial use is also evident.

What is claimed is:

1. An oscillating device for generating electricity from a flow of fluid comprising:
    at least one oscillating part within an angle of oscillation,
    at least one support, fixed to a reference surface and connected to said oscillating part at an axis of oscillation,
    at least one counter-balancing system connected to, and/or acting on, said oscillating part,
    at least one adjustable profile configured to be at least partially immersed in said flow of fluid and movably connected to said oscillating part, and
    at least one adjustment system, which is connected to said at least one adjustable profile and which is configured to change position and resistance of said at least one adjustable profile with respect to said flow of fluid between at least one position of greater resistance, obtained by means of an active constrained force adjustment, and at least one position of lesser resistance, obtained by means of a passive release adjustment or by interruption of said active adjustment,
    wherein said adjustable profile comprises a leading edge and a pressure centre and is movably connected to said oscillating part by at least one connection point, wherein the at least one connection point is located at said leading edge or between said leading edge and said centre of pressure so as to allow the flow of fluid to generate a mechanical moment such as to orient said at least one adjustable profile in said position of least resistance following said passive release adjustment or by interruption of said active adjustment.

2. The oscillating device according to claim 1, further comprising a further recall system comprising an elastic and/or mechanical means that is permanently connected to, and/or acts on, said at least one adjustable profile, in order to obtain, alternatively or in addition to contribution of the flow of fluid, at least one position of least resistance in absence of an active adjustment and/or in an event of failure of said adjustment system.

3. The oscillating device according to claim 1, wherein said at least one adjustable profile comprises a trailing edge to which said adjustment system is connected.

4. The oscillating device according to claim 1, further comprising a rotatable fifth wheel, whose axis of rotation is misaligned with respect to said axis of oscillation to allow the flow of fluid to bring said axis of oscillation downwind with respect to said axis of rotation of said fifth wheel.

5. The oscillating device according to claim 1, wherein said oscillating part comprises side elements connected to said at least one adjustable profile, wherein said side elements are arranged laterally to an oscillating plane of said oscillating part and are configured to allow the positioning of said at least one adjustable profile in said at least one position of greater resistance and in said at least one position of least resistance.

6. The oscillating device according to claim 1, wherein said adjustment system releases temporarily or permanently said adjustable profile when a pressure value of the flow of fluid on said at least one adjustable profile is greater than a predetermined threshold.

7. The oscillating device according to claim 1, further comprising at least one flywheel and/or generator for generating electricity, having an axis of rotation positioned orthogonal to or inclined with respect to said axis of oscillation and/or vertical with respect to the positioning of the oscillating device.

8. The oscillating device according to claims 7, further comprising an elastic system positioned between a system for transmitting motion of the oscillation axis and said flywheel and/or said generator with a function of storing and returning peak forces relative to maximum accelerations during the oscillation and/or sudden increases in fluid intensity.

9. The oscillating device according to claim 1, further comprising a rotatable fifth wheel, at least one flywheel and/or generator for generating electricity, the fifth wheel, the flywheel and/or the generator having respective axis of rotation, wherein the axis of rotation of said flywheel and/or of that said generator coincides with the axis of rotation of said fifth wheel.

10. The oscillating device according to claim 1, further comprising sensors designed to detect one or more of following parameters:
   force and/or direction of the flow of fluid;
   speed and/or acceleration and/or change in direction and/or position of the oscillating part;
   pressure of the flow of fluid on said at least one adjustable profile; and
   generation of electricity and/or number of revolutions of a flywheel.

11. The oscillating device according to claim 10, further comprising a programmable unit connected at least to a control system and at least to one of said sensors, said programmable unit configured to receive and process the parameters detected by said sensors.

12. The oscillating device according to claim 11, wherein said programmable unit configured to carry out:
   active adjustments on several positions of greatest resistance of said at least one adjustable profile so as to trigger a thrust step of said oscillating part,
   passive release adjustments on several positions of least resistance of said at least one adjustable profile so as to trigger a recall step of said oscillating part, and
   rotation of said support and/or of said oscillating part.

13. A method of adjusting an oscillating device, the oscillating device comprising:
   at least one oscillating part within an angle of oscillation between a thrust step and a recall step,
   at least one support, fixed to a reference surface and connected to said oscillating part at an axis of oscillation,
   at least one counter-balancing system connected to, and/or acting on, said oscillating part,
   at least one adjustable profile configured to be at least partially immersed in a flow of fluid and movably connected to said oscillating part,
   at least one adjustment system, which is connected to said at least one adjustable profile and which is configured to change position and resistance of said at least one adjustable profile with respect to said flow of fluid between at least one position of greater resistance obtained by means of an active constrained force adjustment, and at least one position of lesser resistance obtained by means of a passive release adjustment or by interruption of said active constrained force adjustment, and
   sensors designed to detect speed and/or acceleration and/or change in direction and/or position of the oscillating part,
wherein the method comprises said passive release adjustment bringing said at least one adjustable profile to said position of lesser resistance when the sensors detect that the speed of the oscillating part decreases to a predefined value, indicating that the thrust step of the oscillating part is about to be completed.

14. The method according to claim 13, wherein said at least one adjustable profile is maintained in at least one position of lesser resistance for several consecutive recall steps, in such a way that said oscillating device generates electricity due to inertia of the parts and, depending on one or more parameters detected by a set of sensors, a thrust step is subsequently implemented through a position of greatest resistance of said at least one adjustable profile.

15. The method according to claim 13, wherein a programmable unit is configured to receive data from speed sensors, from pressure sensors on said at least one adjustable profiles, from flow sensors and from production sensors which detect the electricity produced and/or the number of revolutions of a flywheel and/or generator having an axis of rotation positioned orthogonal to or inclined with respect to said axis of oscillation and/or vertical with respect to the positioning of the oscillating device, said programmable unit further configured to actuate said passive release adjustment and active constrained force adjustment in a manner proportional to the intensity of said flow of fluid and/or to said angle of oscillation of said oscillating part, so as to obtain different positions of greater resistance and different positions of lesser resistance of said at least one adjustable profiles based on the values detected by said speed sensors, said pressure sensors, said flow sensors and said production sensors.

* * * * *